United States Patent [19]

Van der Schueren et al.

[11] Patent Number: 5,244,690
[45] Date of Patent: Sep. 14, 1993

[54] PROCESS FOR THE PRODUCTION OF CHOCOLATE

[75] Inventors: Freddy M. L. Van der Schueren, Aalst; André L. I. Rapaille, Knokke-Heist; Michel H. A. Gonze, Brussels, all of Belgium

[73] Assignee: Cerestar Holding B.V., Belgium

[21] Appl. No.: 794,868

[22] Filed: Nov. 19, 1991

[30] Foreign Application Priority Data

Nov. 22, 1990 [GB] United Kingdom ............... 9025435
May 13, 1991 [GB] United Kingdom ............... 9110337

[51] Int. Cl.$^5$ ............................................. A23G 1/00
[52] U.S. Cl. ..................................... 426/660; 426/519
[58] Field of Search ............... 426/519, 631, 660, 548

[56] References Cited

U.S. PATENT DOCUMENTS

| 3,544,328 | 12/1970 | Dunning et al. | |
|---|---|---|---|
| 4,151,308 | 4/1979 | Ziccarelli | 426/631 |
| 4,156,743 | 5/1979 | Schmitt | 426/631 |
| 4,346,121 | 8/1982 | Turos | 426/586 |
| 4,713,256 | 12/1987 | Chaveron | 426/631 |
| 4,746,529 | 5/1988 | Rapp | 426/631 |
| 4,973,486 | 11/1990 | Matsumoto | 426/631 |
| 4,980,189 | 12/1990 | Keme | 426/631 |
| 5,017,400 | 5/1991 | Olinger | 426/548 |

FOREIGN PATENT DOCUMENTS

| 0317917 | 11/1988 | European Pat. Off. | |
|---|---|---|---|
| 0393327 | 10/1990 | European Pat. Off. | 426/631 |
| 60-94058 | 5/1985 | Japan | 426/631 |
| 63-129011 | 6/1985 | Japan | 426/631 |
| 86/00787 | 2/1986 | PCT Int'l Appl. | 426/631 |
| 551157 | 6/1991 | Switzerland | |

*Primary Examiner*—Carolyn Paden
*Attorney, Agent, or Firm*—Cushman, Darby & Cushman

[57] ABSTRACT

A method of making chocolate is disclosed. Here sugar alcohol, particularly erythritol or maltitol, is mixed with the remaining ingredients by dry couching at a temperature above 65° C.

10 Claims, No Drawings

PROCESS FOR THE PRODUCTION OF CHOCOLATE

The present invention relates to the production of chocolate, in particular to the production of sugarless chocolate having dietetic properties.

BACKGROUND OF THE INVENTION

The essential components of a conventional chocolate formulation are cocoa "nib", i.e. the roasted cocoa bean with shell and germ removed, sugar and cocoa butter additional to that contained in the nib. Cocoa nib is approximately 55% cocoa butter, the balance being proteins, carbohydrates, tannins, acids etc. The cocoa butter content of the chocolate controls its setting characteristics and largely governs its cost, and while the ratio of cocoa nib to sugar determines the type of chocolate, the cocoa butter content varies according to the application. Thus, bitter sweet chocolate has a ratio of nib to sugar of 2:1 while sweet chocolate has a ratio of 1:2. Moulding chocolate may have a fat content of 32%, covering chocolate 33 to 36%, chocolate for hollow goods 38 to 40% and chocolate for covering ice-cream 50 to 60%.

The typical preparation of chocolate involves four stages. In the first stage the ingredients are mixed together in a process which also involves grinding or rubbing e.g. on a multiple roll press to provide a smooth fluid paste. The ingredients may be added sequentially and in particular the cocoa butter may be added stepwise to control the viscosity of the composition. The sugar may also be pre-ground to a smaller particle size to reduce the length of time required in the grinding/rubbing of the chocolate mixture. Most chocolate, and certainly all good quality product, is subjected after mixing to the process of "conching" in which the chocolate mixture is subjected to mechanical working to give the chocolate a fuller and more homogeneous flavour. Other ingredients such as flavours e.g. vanilla and extra cocoa butter may be added at this stage if desired. A frequently added additional ingredient is lecithin or other emulsifier which improves the flow properties of the chocolate and thereby enables the amount of cocoa butter to be reduced. The third stage of the chocolate preparation is called "tempering" in which nuclei are provided in the liquid chocolate composition to facilitate the rapid crystallisation of its fat content on cooling. The final appearance of the chocolate, its texture and keeping properties depend upon correct tempering stage conditions. After tempering, the chocolate may finally be cast into moulds to set or may be used in an enrobing process to produce chocolate coated confectionery etc.

The present invention is concerned in particular with the conching step in the process described in the preceding paragraph. The changes taking place during conching are subtle and not completely understood. What is certain is that the texture of the chocolate is improved and the flavour changed to the extent that without conching the taste of the chocolate is generally commercially unacceptable. The kneading action during the conching process and the maintenance of an elevated temperature together cause evaporation of moisture and volatile acids such as acetic acid, destroy harsh flavours and reduce astringency, probably due to modification of tannins. There are two types of conching operation called, "dry" conching and "wet" conching. In wet conching all of the cocoa butter and other ingredients such as lecithin are added early in the process to maintain the fluidity of the mass which is then mechanically worked for a prolonged time e.g. 20 or 30 hours or more and at a relatively low temperature e.g. 40° C. up to 60° C. The dry conching process on the other hand is operated for a shorter time e.g. up to 20 hours but at a higher temperature e.g. above 60° C. and usually about 80° C. and in this case the extra cocoa butter and other ingredients are added towards to the end of the conching period e.g. about one hour before the end of the period.

The conventional chocolate composition uses sucrose as sweetener but many other sweeteners have been proposed and some have been used to provide for example dietary type chocolate for diabetics, and slimmers. One class of replacement sweetener for sucrose in chocolate is the so-called sugar alcohols in particular sorbitol, maltitol and mixtures of sugar alcohols known as hydrogenated starch hydrolysates. Sugar alcohol sweeteners, besides contributing fewer calories to the chocolate than the equivalent quantity of sucrose are also far less cariogenic. The disadvantages of using sugar alcohol sweeteners is that in general it is only possible to carry out the conching of the chocolate composition at temperatures below 55° C. and for sorbitol in particular the temperature must not rise above 40° C. Thus, in the publication of the paper entitled "Zuckerfreie Pralinen—Zuckerfreie Füungen und Schokolademassen" presented at the International Conference "Inter-Praline 87'" in June 1987 at the Zentralfachschule der Deutschen Süsswarenwirtschaft, Solingen it is reported that at temperatures above 40° C. conching of chocolate containing sorbitol leads to agglomeration of the mixture and in two compositions containing maltitol and xylitol the conching is carried out at 35° to 38° C. Similarly, in chapter 4 of "Developments in Sweeteners -3" entitled "MALBIT and its applications in the Food Industry" on page 95 the conching temperatures for chocolate compositions containing maltitol are given as 46° C.

The experience of the chocolate industry is that the relatively low temperatures required for the conching of chocolate compositions containing sugar alcohol sweeteners necessitates wet conching for a very long conching time e.g. up to 24 hours and even then the flavour development is not as satisfactory as when a higher conching temperature is possible. We have now found however that there are two sugar alcohols which can be used as part or all of the chocolate sweetener and which permit the composition to be dry conched at an elevated temperature. These sugar alcohols are erythritol and maltitol with the proviso that the maltitol must be more than 90% pure. Erythritol is a symmetrical molecule and is therefore normally available as the meso-form. References to erythritol in the remainder of this specification and in the claims will mean the meso-form.

SUMMARY OF THE INVENTION

Accordingly, the present invention is a process for the production of a chocolate composition comprising a sugar alcohol sweetener which includes a conching step and is characterised in that the conching step is dry conching carried out at a temperature above 65° C. and the sugar alcohol is erythritol or maltitol in which the maltitol has a purity greater than 90%, preferably greater than 95% and especially about 99%.

Preferably, the temperature of the dry conching is in the range 65° to 100° C. more preferably in the range 75° to 85° C. At these temperatures the conching time is suitably up to 20 particularly up to 16, especially 6 to 16 hours.

Japanese patent publication 104243 of 1990 describes the production of a chocolate of cool mouth feel by using erythritol as the sweetening agent. The temperature at which the chocolate was conched is not however given in this publication although the mixing of the ingredients is said to have taken place at 60° C.

The process of the present invention uses a chocolate composition which contains erythritol or maltitol, preferably in an amount in the range 30 to 60% by weight of the composition, more preferably in the range 40 to 60% by weight, particularly in the range 45 to 55% by weight. The composition may contain 30 to 60%, preferably 30 to 50%, more preferably 35 to 45% by weight cocoa nib; and 10 to 20%, preferably 10 to 15% by weight cocoa butter in addition to the cocoa butter contained in the cocoa nib. In general, the use of erythritol or maltitol as the sweetener in the chocolate provides a product of similar appearance and organoleptic properties to an equivalent sucrose based chocolate but containing 2 to 15% by weight less cocoa butter than the latter the 2 to 15% being made up by the equivalent amount of erythritol or maltitol. Cocoa nib, cocoa butter and erythritol or maltitol are essential components of the chocolate compositions according to the present invention but there may also be present other ingredients, particularly an emulsifier such as lecithin, preferably in an amount 0.1 to 0.5% by weight, a synthetic sweetener e.g. aspartame in amounts to taste e.g. 0.01 to 0.05% by weight and any desired flavour e.g. vanilla.

Before reaching the conching stage according to the invention the chocolate composition is first formed by mixing the various ingredients and may then be refined by gentle milling to reduce the crystal size of the components. The mixing of the ingredients may be effected by kneading the erythritol or maltitol, suitably in solid form, and preferably crystalline with cocoa nib and at least part of the additional cocoa butter at a temperature suitably in the range 25° to 60° C., preferably 30° to 40° C.

The conching step may be carried out in equipment conventionally used for this purpose at the temperatures and for the times described earlier in this specification.

Finally, the chocolate after conching is tempered to give the required viscosity and flow characteristics the preferred temperature between 25° and 35° C. being similar to that used for sucrose based chocolate. Since dietetic chocolate containing sorbitol must be tempered over a low, restricted and critical temperature range (e.g. 22°-23° C.) the use of erythritol or maltitol is advantageous since in this respect it may be used in the conventional sucrose based chocolate process without the need for modification.

After tempering, the chocolate may be cast into moulds or otherwise processed depending upon the application in question.

DETAILED DESCRIPTION OF PREFERRED EMBODIMENTS

The invention will now be further illustrated by reference to the following Examples.

EXAMPLE 1

Two compositions were prepared comprising

|  | Composition A | Composition B |
| --- | --- | --- |
| Cocoa nib % | 39 | 42 |
| Additional cocoa butter % | 13 | 13.5 |
| Erythritol % | 47.7 | — |
| Sucrose % | — | 44.2 |
| Lecithin % | 0.28 | 0.28 |
| Vanillin % | 0.02 | 0.02 |
| Aspartame % | 0.03 | |

All percentages are based on the weight of the final composition. The preparation of the chocolate took place as follows:

1) Mixing

In both Compositions, the cocoa nib, 23% of the added cocoa butter and the erythritol/sucrose were ground and mixed together to form a homogeneous mass at a temperature of 30° to 40° C.

2) Refining

Composition A from step (1) was gently milled on a five roller mill and after one pass the desired average particle size of 20 to 40 μm was achieved. Composition B required a longer residence time on the rollers and cooling water had to be fed at an increased rate to the rollers compared with Composition A. The temperature in this stage was 25° to 45° C.

3) Conching

Conching took place in a rotary concher of the "Petzholdt" type. Composition A was conched at 80° C. for 16 hours and composition B at 60° C. for 22 hours. The remaining cocoa butter and the lecithin were added to composition A after 14 hours and 15 hours respectively and to composition B after 20 and 21 hours respectively.

4) Tempering

Both compositions were tempered by reducing the temperature of the conched mass to 28° to 31° C. in order to induce the crystallisation of the fat in the chocolate in its stable beta-form.

The products of tempering were cast into moulds and after cooling were evaluated orgoleptically by a taste panel and visually after a storage period of three months. Both products had excellent gloss, good breaking properties and mouth feel. After six months storage at ambient temperature no "bloom" was observed on the products.

EXAMPLE 2

A composition was prepared comprising

| Cocoa nib | 42% |
| --- | --- |
| Additional cocoa butter | 13.5% |
| 99% pure crystalline maltitol | 44.2% |
| Lecithin | 0.28% |
| Vanillin | 0.02% |

All percentages are based on the weight of the final composition.

The preparation of the choclate took place as is described in Example 1. The conching temperature was 80° C. and the conching time 10 hours. The second part of the additional cocoa butter was added after 8 hours of conching and the lecithin and vanillin after 9 hours of conching.

The chocolate product was evaluated by a taste panel and was judged to be of good quality with good appearance and excellent mouth feel.

A similarly acceptable product was obtained by using a 93% pure maltitol but when an 87.5% pure maltitol was used the chocolate produced had a gritty mouth feel and during preparation lump formation was observed which required an increasing mixing force to eliminate.

EXAMPLE 3

A composition was prepared comprising

| | |
|---|---|
| Cocoa nib | 11.4% |
| Additional cocoa butter | 23.4% |
| Erythritol | 42.5% |
| Whole milk powder | 22.4% |
| Lecithin | 0.3% |

All percentages are based on the weight of the final composition.

The preparation of the chocolate took place by the method described in Example 1, the milk powder being added during the mixing stage. The conching took place at 70° C. for 10 hours with the additional cocoa butter being introduced after 8 hours of conching and the lecithin after 9 hours of conching.

The milk chocolate product was evaluated by a taste panel and was judged satisfactory in every respect.

EXAMPLE 4

A composition was prepared comprising

| | |
|---|---|
| Cocoa nib | 11.2% |
| Additional cocoa butter | 25.4% |
| 99% pure crystalline maltitol | 41.3% |
| Whole milk powder | 21.8% |
| Lecithin | 0.3% |

The preparation of the chocolate took place as is described in Example 3. Once again a satisfactory product was obtained.

We claim:

1. In a process for the production of chocolate comprising forming a mixture of the chocolate ingredients including, as sweetener, a sugar alcohol, and submitting the mixture to a conching step; the improvement which comprises the conching step is dry conching carried out at a temperature of at least 65° C. and the sugar alcohol is erythritol or maltitol which has a purity greater than 90%.

2. A process according to claim 1 characterised in that the conching temperature is in the range 75° to 85° C.

3. A process according to claim 1 or claim 2 characterised in that the conching is carried out for a period of up to 16 hours, especially 6 to 16 hours.

4. A process according to claim 1 or claim 2 characterised in that the chocolate composition comprises 30 to 60% by weight erythritol or maltitol, preferably 40 to 60% by weight, particularly 45 to 55% by weight, the other components of the composition comprising cocoa nib and cocoa butter in addition to the cocoa butter contained in the cocoa nib.

5. A process according to claim 4 characterised in that the chocolate composition contains 30 to 60% by weight cocoa nib and 10 to 20% by weight cocoa butter in addition to the cocoa butter contained in the cocoa nib.

6. A process according to claim 4 or claim 5 characterised in that the chocolate composition also contains a emulsifier such as lecithin.

7. A process according to any one of claims 4 to 6 characterised in that the chocolate composition contains an intense sweetener e.g. aspartame.

8. A process as set forth in claim 1 in which the temperature of the dry conching is in the range 65°–100° C.

9. A process as set forth in claim 1 in which the purity of the maltitol is greater than 95%.

10. A process as set forth in claim 9 in which the purity of the maltitol is about 99%.

* * * * *